UNITED STATES PATENT OFFICE.

WILHELM BAUER, OF VOHWINKEL, AND ALFRED HERRE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

BLUE DYE.

961,398.

Specification of Letters Patent. Patented June 14, 1910.

No Drawing. Application filed November 4, 1909. Serial No. 526,203.

*To all whom it may concern:*

Be it known that we, WILHELM BAUER and ALFRED HERRE, doctors of philosophy, chemists, citizens of the German Empire, residing at, respectively, Vohwinkel and Elberfeld, Germany, have invented new and useful Improvements in New Dyes, of which the following is a specification.

Our invention relates to the manufacture and production of new and valuable vat dyestuffs. They are obtained by condensing isatin derivatives substituted in ortho position to the imino group by a substituent, other than halogen such as methyl, ethyl, methoxy, ethoxy or the like, in which isatins the oxygen of the alpha-keto group is replaced by easily movable or replaceable substituents, e. g. halogen, sulfur, the amino group, the alkoxy group, with 1-naphthol compounds, especially 1-naphthol and its substituted derivatives having a free ortho position to the hydroxy group.

The new dyes are in a dry state dark blue crystalline powders with a metallic luster which are soluble in hot nitrobenzene generally with a blue coloration, and which yield with hydrosulfite and caustic soda lye vats dying cotton after exposure to air blue shades remarkable for their fastness to chlorin.

In order to illustrate the new process more fully we can proceed as follows, the parts being by weight:—161 parts of ortho-methylisatin are converted in a dry benzene suspension into ortho-methylisatinchlorid by heating it with 208.5 parts $PCl_5$. The mixture thus obtained is then poured into a solution which is well stirred of 189 parts of 4-ethoxy-1-naphthol in dry benzene. The stirring is continued for a short time and the dye which separates on cooling is filtered off and washed. It is a dark blue crystalline powder with a copper luster, soluble in hot benzene with a blue and in concentrated sulfuric acid with a greenish-blue coloration. It yields with hydrosulfite and NaOH a yellow vat from which cotton is dyed yellow changing on exposure to air into a fast deep reddish-blue fast to chlorin.

Naphthol or other naphthol compounds may be used, e. g. 5-methoxy-1-naphthol; and instead of the above isatin derivatives others may be used, e. g. ortho-paradimethylisatin chlorid, etc.

We claim:

1. The herein described new dyestuffs obtainable from an isatin derivative substituted in ortho-position to the imino group by the hereinbefore defined substituents in which isatins the oxygen of the alpha-keto group is replaced by easily movable or replaceable substituents and a hereinbefore defined 1-naphthol compound, which dyestuffs are in a dry state dark blue crystalline powders with a metallic luster which are soluble in hot nitrobenzene generally with a blue coloration, and which yield with hydrosulfite and caustic soda lye vats dyeing cotton after exposure to air blue shades remarkable for their fastness to chlorin, substantially as described.

2. The herein described new dyestuff obtainable from ortho-methylisatin-alpha-chlorid and 4-ethoxy-1-naphthol, which dyestuff is in a dry state a dark blue crystalline powder with a copper luster, soluble in hot benzene with a blue and in concentrated sulfuric acid with a greenish-blue coloration, and which yields with hydrosulfite and caustic soda lye a yellow vat from which cotton is dyed yellow changing on exposure to air into a deep reddish-blue remarkable for its fastness to chlorin, substantially as described.

In testimony whereof we have hereunto set our hands in the presence of two subscribing witnesses.

WILHELM BAUER. [L. S.]
ALFRED HERRE. [L. S.]

Witnesses:
OTTO KÖNIG,
CHAS. J. WRIGHT.